US010749860B2

(12) United States Patent
Liou (10) Patent No.: US 10,749,860 B2
(45) Date of Patent: Aug. 18, 2020

(54) SYSTEMS AND METHODS FOR AUTHENTICATING DEVICES USING SINGLE FACTOR DYNAMIC AUTHENTICATION (71) Applicant: Kean University, Union, NJ (US)

(72) Inventor: Jing-Chiou Liou, Marlboro, NJ (US)

(73) Assignee: Kean University, Union, NJ (US)

( * ) Notice: Subject to any disclaimer, the term of this patent is extended or adjusted under 35 U.S.C. 154(b) by 109 days.

(21) Appl. No.: 15/141,076

(22) Filed: Apr. 28, 2016

(65) Prior Publication Data
US 2016/0381009 A1 Dec. 29, 2016

Related U.S. Application Data (60) Provisional application No. 62/184,507, filed on Jun. 25, 2015.

(51) Int. Cl.
G06F 7/04 (2006.01)
H04L 29/06 (2006.01)

(52) U.S. Cl.
CPC .............. H04L 63/0838 (2013.01)

(58) Field of Classification Search
CPC .............. H04L 63/0838; G06F 21/83
See application file for complete search history.

(56) References Cited

U.S. PATENT DOCUMENTS

| 2007/0050840 | A1* | 3/2007 | Grandcolas | H04L 63/08 726/5 |
| 2009/0044282 | A1* | 2/2009 | Govindaraju | G06F 21/83 726/27 |
| 2013/0080780 | A1* | 3/2013 | Mister | G06F 21/36 713/168 |
| 2013/0159195 | A1* | 6/2013 | Kirillin | G06Q 20/322 705/71 |
| 2013/0159196 | A1* | 6/2013 | DiZoglio | G06Q 20/20 705/72 |
| 2013/0305041 | A1* | 11/2013 | Bar-El | H04L 63/166 713/156 |
| 2015/0088754 | A1* | 3/2015 | Kirsch | G06Q 20/0855 705/71 |
| 2017/0235962 | A1* | 8/2017 | Clark | G06F 21/83 726/26 |

OTHER PUBLICATIONS

International Patent Application No. PCT/US16/29741, International Search Report dated Jul. 29, 2016, 3 pages.
International Patent Application No. PCT/US16/29741, Written Opinion of the International Searching Authority, dated Jul. 29, 2016, 4 pages.

* cited by examiner

Primary Examiner — Farid Homayounmehr
Assistant Examiner — Lizbeth Torres-Diaz
(74) Attorney, Agent, or Firm — Morgan, Lewis & Bockius LLP (57) ABSTRACT A computer-implemented method for predicting a random pattern keypad based on a binding code and a session code; receiving a password input from the user via the random pattern keypad; generating a virtual one-time password based on the password input from the user; and transmitting the virtual one-time password to the server device to authenticate the client device and access services offered by the server device.

19 Claims, 8 Drawing Sheets

SYSTEMS AND METHODS FOR AUTHENTICATING DEVICES USING SINGLE FACTOR DYNAMIC AUTHENTICATION

CROSS-REFERENCE TO RELATED APPLICATIONS

This application claims the benefit of U.S. Provisional Patent Application No. 62/184,507 filed Jun. 25, 2015 entitled "Systems and Methods for Authenticating Devices Using Single Factor Dynamic Authentication", incorporated by reference herein in its entirety.

BACKGROUND

The present invention generally relates to authentication and, more particularly, to systems and methods for authenticating devices using single factor dynamic authentication.

BRIEF DESCRIPTION OF THE SEVERAL VIEWS OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings.

DETAILED DESCRIPTION

Over the last few decades, people have increasingly relied on computer networks and the Internet to communicate, process and store sensitive information. Once used primarily for academic purposes, these networks have become a vehicle for communicating such confidential information as credit card transactions, bank account transactions, and corporate intellectual property. As the quantity and value of the data being communicated has increased, security breaches have increased proportionately.

Authenticating a user before providing access to sensitive information is one way to minimize security breaches. By authenticating, a system can verify a user's credentials when they are requesting services from any secure system.

There are a number of different methods for authenticating a user. For example, most users today rely on single factor static authentication. Single factor static authentication only requires a username/password pair for the user to log into the system. However, with the increase in security breaches due to compromised usernames and passwords, there is an increasing need to develop a better authentication mechanism that increases security.

Another method for authenticating a user is multi-factor authentication. Multi-factor authentication requires additional factors (e.g., physical card, security token, or biometrics) in addition to username/password, to authenticate a user. For example, banks generally require multi-factor authentication to access ATMs. The first factor is a PIN a user enters when attempting to access funds. A second factor is a physical card issued by the bank that the customer slides into the ATM. Without both, the ATM cannot authenticate the user and provide the user access to ATM services. However, while using multi-factor authentication will increase security, it will also increase difficulty in deployment complexity, hardware requirement and other aspects such as portability, lost recovery, identity backup and replacement cost.

A third method for authenticating a user is dynamic authentication. Dynamic authentication uses cryptography or other techniques to create per-session authentication. One example of dynamic authentication is a one time password. A one-time password is a password that is valid for only one login session or transaction, on a computer system or other digital device. One-time passwords avoid a number of shortcomings that are associated with traditional static password based authentication because, even if the one-time password is compromised, it expires after one use. A number of implementations also incorporate multi-factor authentication by ensuring that the one-time password requires access to something a person has (e.g., a keyfob security device with the one-time password calculator built into it) as well as something a person knows (e.g., a traditional static password).

While dynamic authentication is best used in multi-factor authentication as described above, multi-factor authentication can be difficult to implement on a large scale due to the need for additional hardware (e.g., a keyfob security device). Since more and more computer users today use mobile devices for light to medium computing, a single-factor dynamic authentication is a better option as the first line of defense in security vs. multi-factor authentication.

In embodiments described herein, there is provided systems and methods that implement single factor virtual one-time passwords. In these embodiments, a user only needs to have one factor of credential (e.g., a static password) to authenticate and access services offered by a server. To generate a virtual one-time password, a client device displays a random pattern keypad with rearranged number labels to a user. Yet, even though the client device rearranges the number labels on a random pattern keypad, the number positions still correspond to number values on a conventional key pad. Therefore, when the user enters the static password on a random pattern keypad by selecting the key pad with the corresponding number labels, the user is entering a different number sequence as a one-time password. When the one-time password is transmitted to the server, the server will compare the one-time password to a one-time password produced by the server to authenticate the user. If the passwords match, then the client device is authenticated.

Referring to the drawings in detail, wherein like reference numerals indicate like elements throughout, there is shown in FIGS. 1-6, systems and methods for authenticating a client device using single factor dynamic authentication, generally designated, in accordance with an exemplary embodiment of the present invention.

Figure 1:
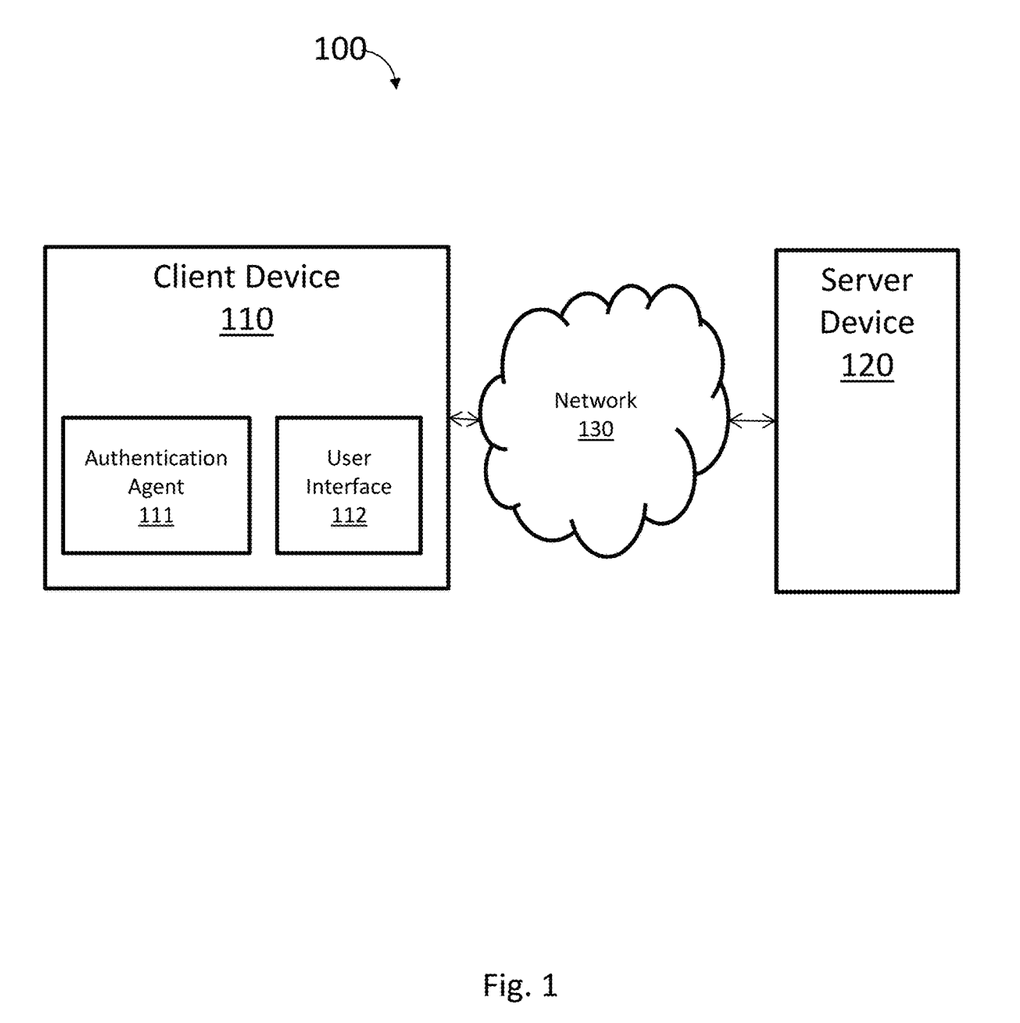
FIG. 1 is a conceptual block diagram of a system configured to authenticate a client device using single factor dynamic authentication according to at least one embodiment of the present invention.

FIG. 1 is a conceptual block diagram of system 100 configured to authenticate a client device using single factor dynamic authentication according to at least one embodiment of the present invention.

System 100 includes a client device 110 (e.g., a personal computer or smart phone) and a server device 120. Client device 110 and server device 120 exchange data via a network 130. In some embodiments, the data is encrypted. One example of an encryption method is the Blowfish algorithm, published as "Description of a New Variable-Length Key, 64-Bit Block Cipher (Blowfish)" in Fast Software Encryption, Cambridge Security Workshop Proceedings (December 1993), Springer-Verlag, 1994, pp. 191-204 by Bruce Schneier, incorporated by reference herein in its entirety.

In some embodiments, server device 120 offers services to client device 110. To access the services, client device 110 transmits authentication data, and specifically a virtual one-time password, to server device 120. Server device 120 then processes the authentication data to determine whether to authenticate client device 110 and provide access to the services offered by server device 120.

In some embodiments, client device 110 includes an authentication agent 111. Authentication agent 111 is a software module installed and executed on client device 110 for purposes of authenticating a user of client device 110. As described in further detail herein, authentication agent 111, among other things, is configured to register a user, bind a user with client device 110 and generate dynamic one-time passwords for user authentication.

In some embodiments, client device 110 includes a user interface 112. As will be explained in more detail below, user interface 112 is configured to display a random pattern keypad. In some embodiments, authentication agent 111 causes user interface 112 to display different patterns of numbers and letters on a virtual random pattern keypad each time a user attempts to authenticate on client device 110 in order to generate dynamic one-time passwords for user authentication. By using different patterns of characters (e.g., numbers and/or letters), authentication agent 111 can convert a static password provided by a user into a dynamic one-time password for improved user authentication using a single factor (i.e., static password).

Figure 2A:
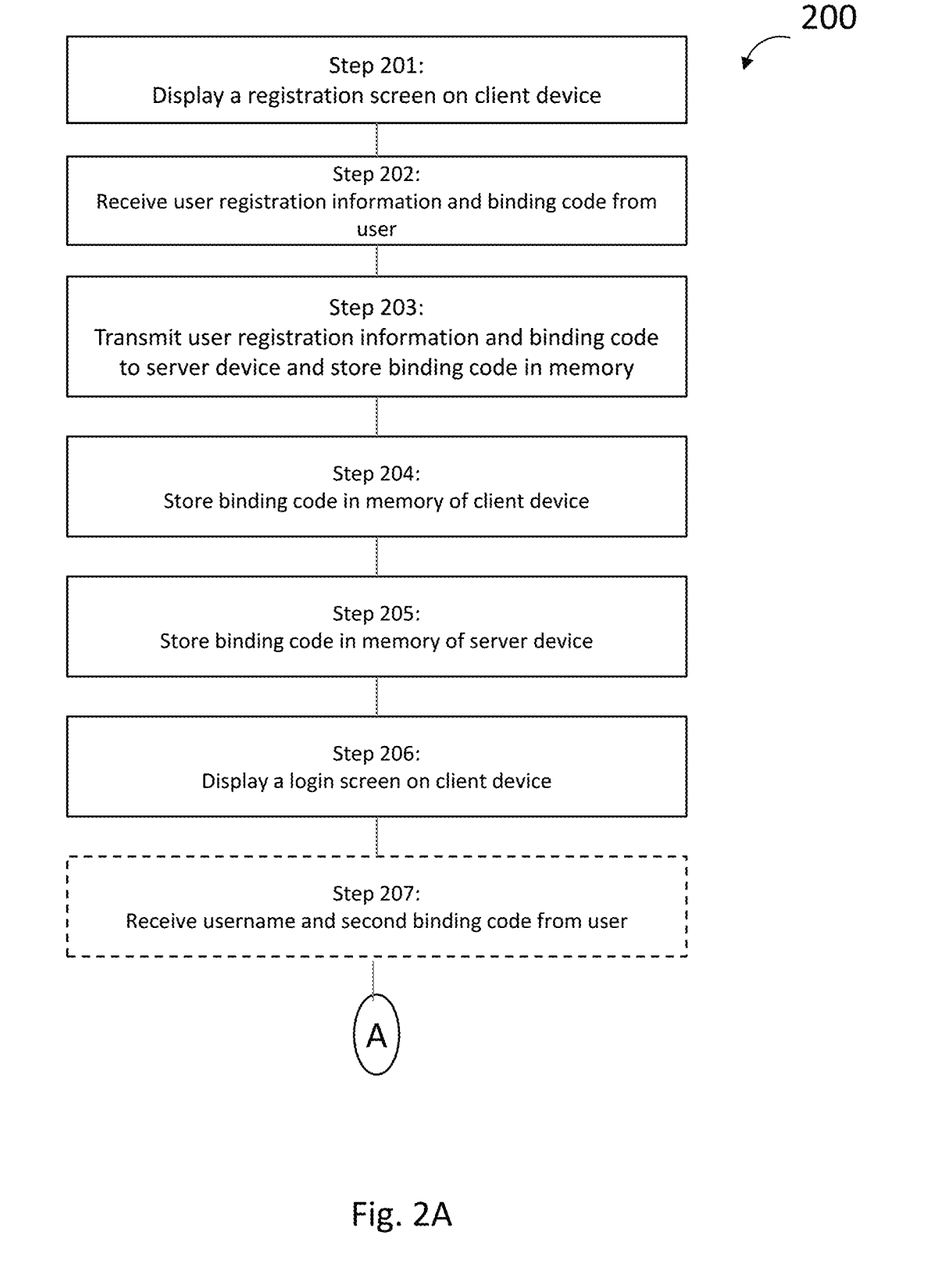
FIGS. 2A-2C depict a flowchart of method steps for authenticating a client device using single factor dynamic authentication according to at least one embodiment of the invention.
Figure 2B:
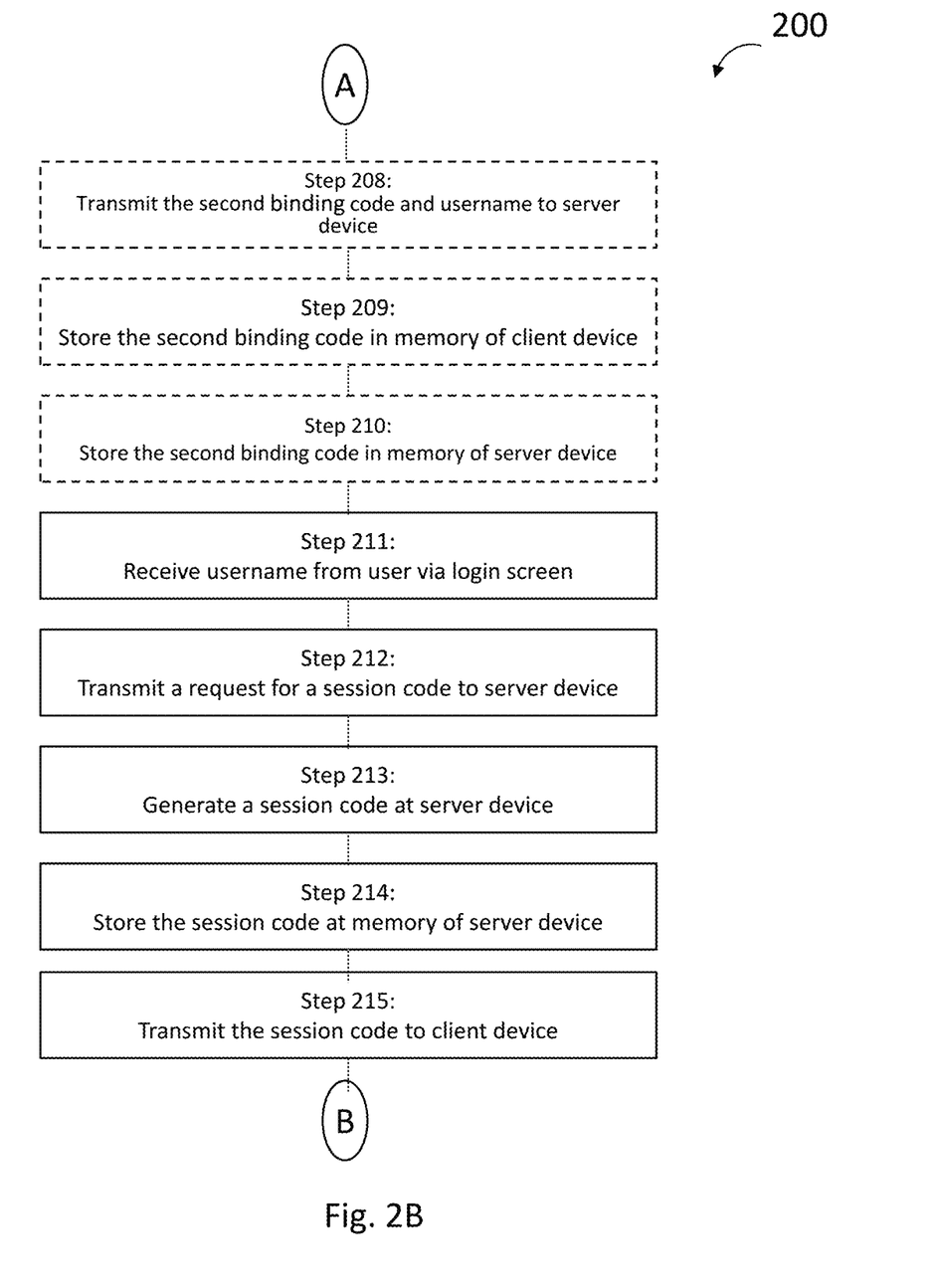
Figure 2C:
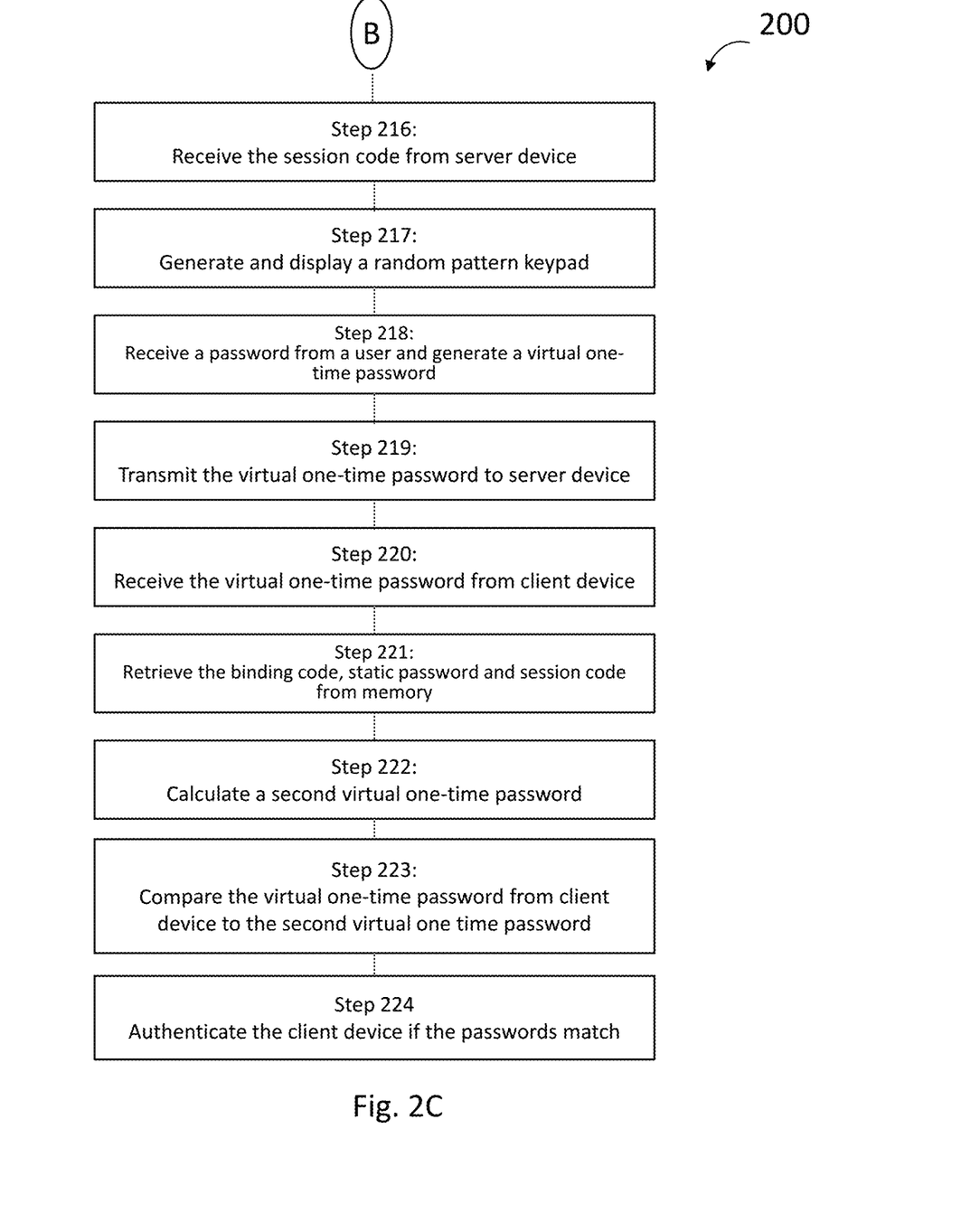

FIGS. 2A-2C depict a flowchart of method steps for authenticating a client device using single factor dynamic authentication according to at least one embodiment of the invention. This embodiment includes three steps for authenticating a client device using single factor authentication: registration, binding and authentication.

Registration

To authenticate using virtual one-time passwords, users first register with server device 120. The registration process allows the user to provide user registration information (e.g., a user name and a static password) to service device 120. The user registration information is later used to authenticate the user during subsequent login attempts when the user provides a virtual one-time password. Without the initial user registration information, server device 120 will not be able to confirm that the user is providing the correct virtual one-time password when attempting to authenticate with server device 120.

Initially, when a user visits a web site to register for a service offered by server device 120, the user downloads and executes authentication agent 111 on client device 110. Upon execution, at step 201, authentication agent 111 causes user interface 112 to display a registration screen. At the registration screen, the user provides user registration information (e.g., a username and a static password) and a binding code. The binding code represents an association between the client device 110 and server device 120. In some embodiments, the binding code may be user-selected, randomly-generated, numeric, alphanumeric, symbols, etc. For purposes of authentication, the binding code acts as a virtual second factor along with the user registration information provided by the user. Both the binding code and the user registration information will be used later to generate a virtual one-time password for authenticating the user.

At step 202, authentication agent 111 receives the user registration information and binding code provided by the user via the registration screen. At step 203, authentication agent 111 transmits the user registration information (e.g., username, password) and binding code to server device 120. At step 204, authentication agent 111 stores the binding code in memory of client device 110. At step 205, server device 120 stores the username, password and binding code in memory of server device 120.

Figure 3:
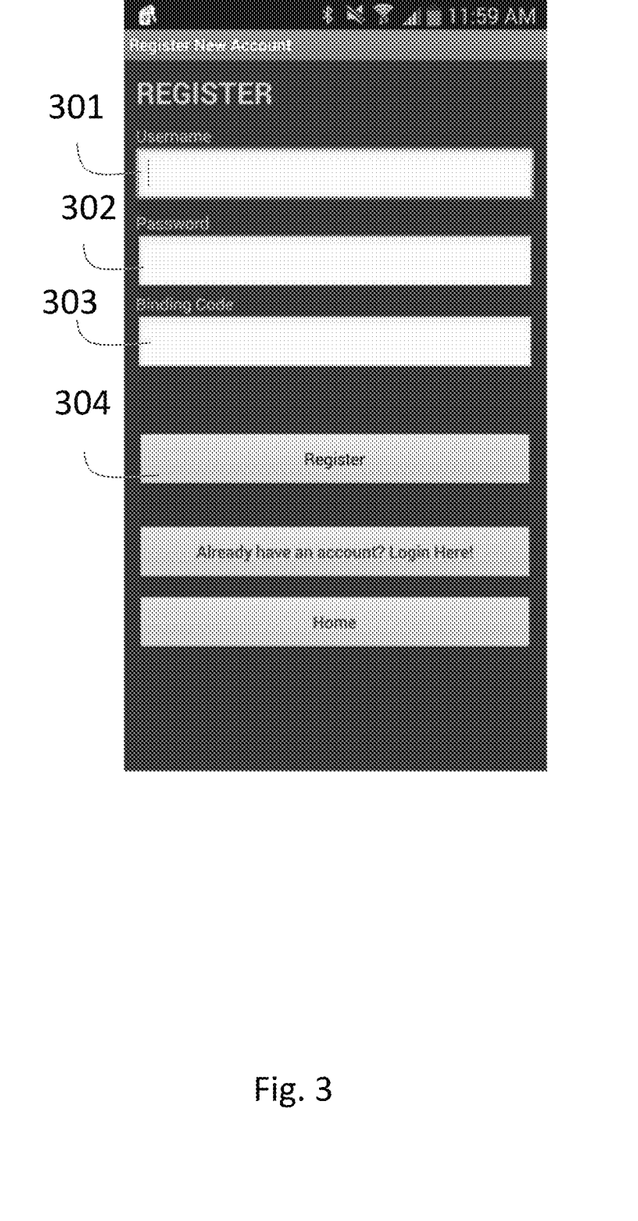
FIG. 3 shows an exemplary registration screen, according to at least one embodiment of the invention.

FIG. 3 shows an exemplary registration screen, according to at least one embodiment of the invention. In this embodiment, the registration screen includes user-input fields such a username input field 301, a password input field 302, a binding code input field 303. The user provides the username, password and binding code to the respective user-input fields 301-303. The registration screen also includes a registration button 304 that, when selected, causes authentication agent 111 to transmit the username, password and binding code provided at user-input fields 301-303 to server device 120.

Binding

In some embodiments, authentication agent 111 provides the user with the capability to change the binding code after registration by entering a second binding code. Because the binding code is later used to generate the virtual one-time password, if an unauthorized user gains access to the binding code (e.g., man-in-the-middle attack), it could compromise the security of the virtual one-time password. By allowing the user to change the binding code after registration, the authentication agent 111 can increase security and prevent unauthorized authentications by rendering an old binding code obsolete, along with any subsequent virtual one-time passwords generated from the obsolete binding code, once a second binding code is created by the user.

In some embodiments, after registration, a user may attempt to authenticate on a client device 110 that is accessible to the public (i.e., a public device). In these embodiments, where client device 110 is a public device, authentication agent 111 provides the user with the capability to enter a binding code and thereby temporally bind the public device with server device 120. Once the public device and server device 120 are bound, the public device can generate the correct random pattern keypad for a user.

In some embodiments, such as when client device is a public device, authentication agent 111 may be configured to limit the number of times (e.g., one, two, three) the binding code can be used for a secure authentication session (i.e., secure session) to a predetermine number. A secure session is created each time a user properly authenticates with services offered by server device 120. In these embodiments, once the binding code is used a predetermined number of times and the secure session terminates, the binding code expires. In subsequent requests to access services offered by server device 120, the user will need to create a second binding code. By using temporary binding codes, a user can avoid the possibility of an unauthorized user compromising the binding code by using an unauthorized key logger application installed on client device 110 to log the binding code when the user inputs the binding code on client device 110.

To enter or change a binding code, at step 206, authentication agent 111 causes user interface 112 to display a login screen on client device 110. At step 207, authentication agent 111 receives the username of the user and a second binding code provided by the user via the login screen. At step 208, authentication agent 111 transmits the second binding code, along with the username, to server device 120. Then, at step 209, authentication agent 111 replaces previous binding codes with the second binding code and stores the second binding code in memory of client device 110. At step 210, server device 120 replaces previous binding codes with the second binding code and stores the second binding code in memory of server device 120.

Figure 4A:
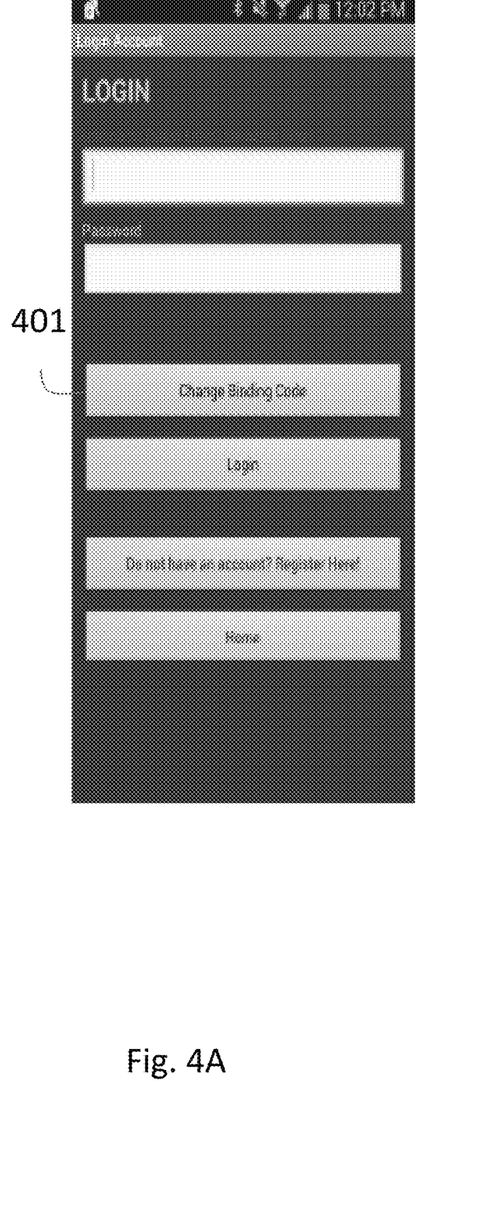
FIGS. 4A-4B show an exemplary login screen for entering a binding code according to at least one embodiment of the invention.
Figure 4B:
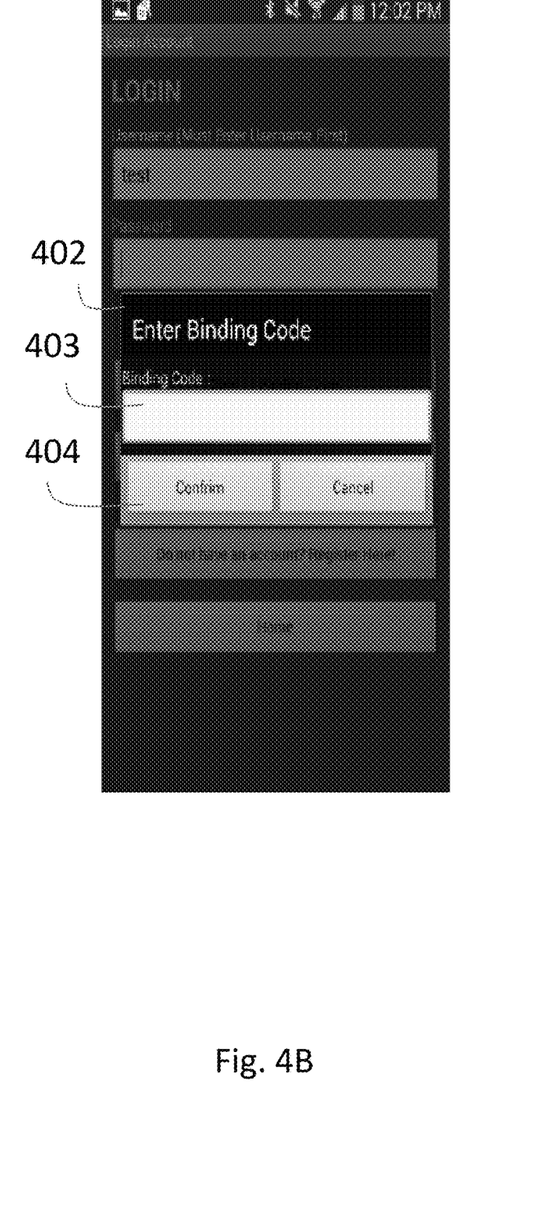

FIGS. 4A-4B show an exemplary login screen for entering a binding code according to at least one embodiment of the invention. In FIG. 4A, the login screen includes a "change binding code" button 401. When the "change binding code" button 401 is selected by a user, the authentication agent 111 generates a binding code prompt 402 shown in FIG. 4B. The binding code prompt 402 include a binding code input field 403 and a "confirm" button 404. After the user provides a second binding code at binding code input field 403 and selects the "confirm" button 404, the authentication agent 111 transmits the second binding code to server device 120.

Authentication

After registering, a user can authenticate to access services provided by server device 120. At step 211, authentication agent 111 receives a username provided by the user via the login screen. Next, at step 212 authentication agent 111 transmits a request for a session code to server device 120. The request for a session code may also include at least one of: a username and binding code. The session code is a random one-time use code provided by server device 120. The session code is later used by authentication agent 111, along with the binding code, to generate a random pattern keypad when the user attempts to provide a password at login on client device 110. The session code is for one-time use to ensure that the random pattern keypad generated at client device 110 is unique for each authentication session. Should the user request to authenticate again, during another session, server device 120 will transmit a new unique session code thereby causing authentication agent 111 to generate a new random pattern keypad. By generating unique session codes for each authentication session, the system 100 further ensures that a password entered by the user using the random pattern keypad is unique for each authentication session.

At step 213, after server device 120 receives the request for the session code, server device 120 generates the session code using a random number generator. A random number generator is a computational or physical device designed to generate a sequence of numbers or symbols that lack any pattern, i.e. appear random, based on an initial seed value (or seed).

At step 214, server device 120 stores the session code in memory of server device 120. At step 215, server device 120 transmits the session code to client device 110.

At step 216, client device 110 receives the session code. At step 217, authentication agent 111 provides a random pattern keypad for display on user interface 112 using the session code and the previously stored binding code. To provide the random pattern keypad, authentication agent 111 uses the session code and binding code as an initial seed value in a random number generator (e.g., the session code and binding code are added together to form a single initial seed value). After the random number generator generates a number, authentication 111 can identify or generate a random pattern keypad using a number of different methodologies. In one exemplary methodology, each of the numbers produced by the random number generator is assigned to a number label. As the numbers are produced, authentication agent 111 assigns a number label to number positions of a conventional keypad position, starting at number position 1 and proceeding through number position 0. Authentication agent 111 then causes user interface 112 to display the random pattern keypad. In another methodology, authentication agent 111 may be configured to store, in memory, a predetermined number of random pattern keypads, each assigned to a number. Using the random number generated by the random number generator, authentication agent 111 then selects the random pattern keypad stored in memory that is assigned to the random number. Authentication agent 111 then causes user interface 112 to display the random pattern keypad.

At step 218, authentication agent 111 receives a password input (e.g., a static password) provided by the user via the random pattern keypad and generates a virtual one time password. As explained above, even though the client device rearranges the number labels on a random pattern keypad, the number values for each number input still correspond to conventional keypad number values. In other words, each number input of the random pattern keypad includes a corresponding number value and a corresponding number label, but the corresponding number label differs from the corresponding number value. Therefore, when the user enters the static password on a random pattern keypad by selecting the key pad with the corresponding number labels, the user is entering a different number sequence as a virtual one-time password. The password is only produced a single time via the random pattern keypad because the session code sent by server device 120 is only valid for one authentication session. The next time the user attempts to authenticate, server device 120 will send a different session code. Thus, the random pattern keypad will change every time the user attempts to authenticate with server device 120. Therefore, even though the user provides the same static password each time the user attempts to authenticate, authentication agent 111 will create a virtual one-time password each time and transmit the virtual one-time password to server device 120.

Figure 5:
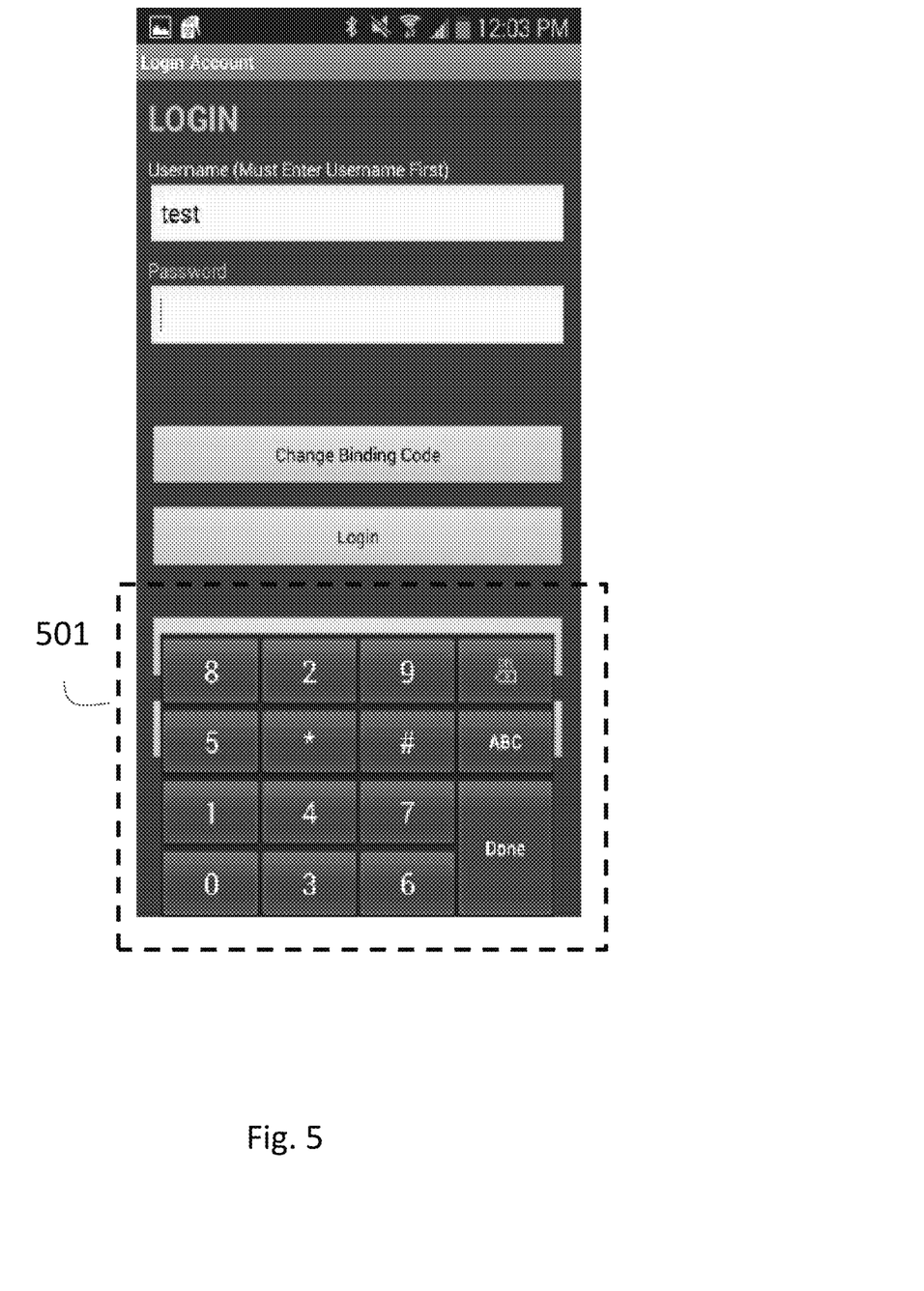
FIG. 5 shows an exemplary login screen having a random pattern keypad according to at least one embodiment of the invention.

FIG. 5 shows an exemplary login screen having a random pattern keypad 501 according to at least one embodiment of the invention. In this embodiment, each of the number labels are rearranged or repositioned on the random pattern keyboard. Yet, even though the client device rearranges the number labels on a random pattern keypad, the number positions still correspond to a conventional key pad (e.g., the '8' number label is on number position '1' so if a user presses '8,' the authentication agent 111 will record a '1' as the user input). Thus, if a user enters a password by selecting the number labels that correspond to the static password, the authentication agent 111 will record a virtual one-time password. For example, if password is 1234, the encrypted and transmitted password will be 7208 for this particular keypad pattern.

At step 219, authentication agent 111 transmits the virtual one-time password, along with the username, to server device 120. At step 220, server device 120 receives the virtual one-time password and username. At step 221, server device 120 retrieves the binding code, static password and session code from memory. Then, at step 222, server device 120 calculates a second virtual one-time password based on the binding code, static password and session code for validation purposes. To calculate the one-time password, server device 120 uses the algorithm used by the random number generator and the authentication agent 111 on client device 110. At step 223, server device 120 then compares the second virtual one-time password to the received virtual one-time password to validate the user's virtual one-time password. If the second virtual one-time password matches the received virtual one-time password, at step 224, server device 120 authenticates client device 110 to access services offered by server device 120 for one session. If the passwords do not match, then server device 120 denies authentication to client device 110.

Figure 6:
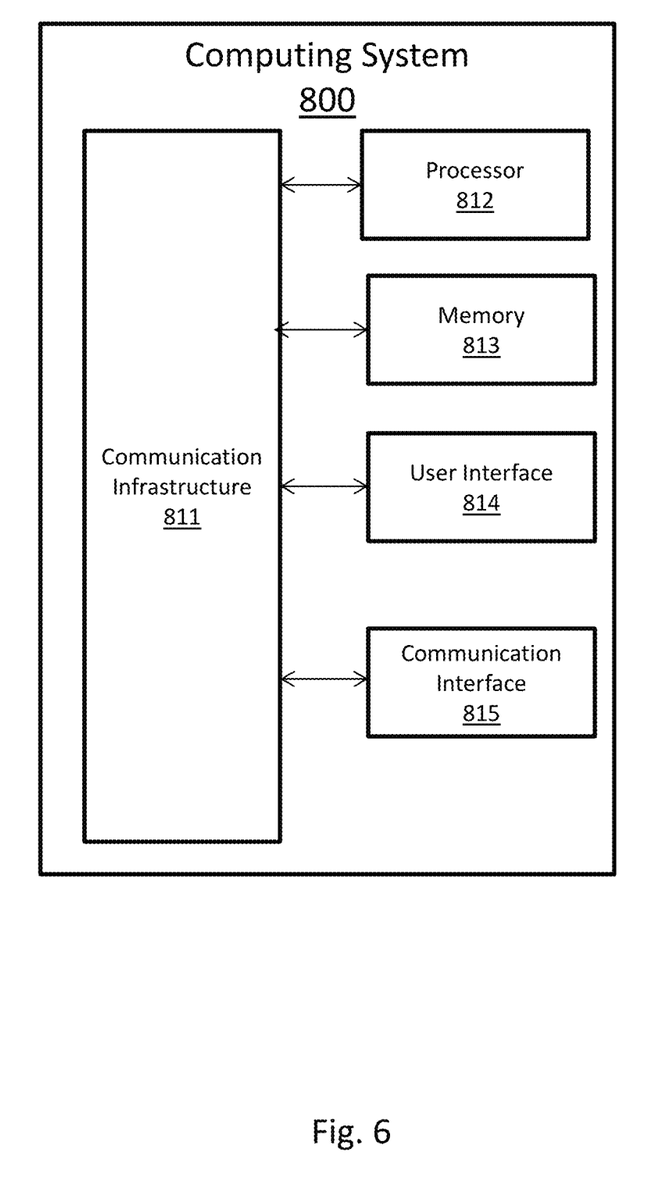
FIG. 6 is a diagram of an exemplary computer system that may be used to carry out the methods of the present invention.

FIG. 6 is a diagram of an exemplary computer system that may be used to carry out the methods of the present invention. Computer system 800, as shown in FIG. 6, may be used to implement the methods of the present invention, which methods may be implemented as programmable code for execution by computer system 800. More particularly, computer system 800 may be implemented as client device 110 and/or server device 120. Computer system 800 comprises hardware, as described more fully herein, which is used in connection with executing software/computer programming code (i.e., computer readable instructions) to carry out the steps of the methods described herein.

Computer system 800 includes one or more processors 812. Processor 812 may be any type of processor, including but not limited to a special purpose or a general-purpose digital signal processor. Processor 812 may be connected to a communication infrastructure 811 (e.g. a data bus or computer network) either via a wired connection or a wireless connection. Communication infrastructure 811 carries signals and may be implemented using wire or cable, fiber optics, a phone line, a wireless link, a cellular phone link, a radio frequency link, or any other suitable communication channel, including a combination of the foregoing exemplary channels.

Computer system 800 includes one or more memories 813. Memory 813 may include at least one of: random access memory (RAM), a hard disk drive and a removable storage drive, such as a floppy disk drive, a magnetic tape drive, or an optical disk drive. The removable storage drive reads from and/or writes to a removable storage unit. The removable storage unit can be a floppy disk, a magnetic tape, an optical disk, which is read by and written to a removable storage drive.

In alternative implementations, memory 813 may include other similar means for allowing computer programs or other instructions to be loaded into computer system 800. Such means may include, for example, a removable storage unit and an interface. Examples of such means may include a removable memory chip (such as an EPROM, or PROM, or flash memory) and associated socket, and other removable storage units and interfaces which allow software and data to be transferred from removable storage unit to computer system 800. Alternatively, the program may be executed and/or the data accessed from the removable storage unit, using the processor 812 of the computer system 800.

Computer system 800 includes one or more user interfaces 814. User interface 814 may be a program that controls a display (not shown) of computer system 800, on which the output of the processes described herein can be displayed. User interface 814 may include one or more peripheral user interface components, such as a keyboard or a mouse. The end user may use the peripheral user interface components to interact with computer system 800. User interface 814 may receive user inputs, such as mouse inputs or keyboard inputs from the mouse or keyboard user interface components.

In some embodiments, user interface 814 displays data on the display of computer system 800 using a web browser. A web browser may be an application with the ability to render HTML pages, Cascading Style Sheets (CSS) and JavaScript content on the display of user interface 814. In some embodiments, user interface 814 displays data, such as web pages, on the display of client device 110 using another software application. One of ordinary skill in the art will appreciate that user interface 814 is not limited to displaying data using a web browser or another software application, and that embodiments of the present invention may contemplate using other display devices or software suitable for the purposes of the displaying the data.

Computer system 800 may also include a communication interface 815. Communication interface 815 allows software and data to be transferred between computer system 800 and an external device. Examples of communication interface 815 may include a modem, a network interface (such as an Ethernet card), and a communication port, by way of example. Software and data transferred via communication interface 815 are in the form of signals, which may be electronic, electromagnetic, optical, or other signals capable of being received by communication interface 815. These signals are provided to communication interface 815 via a communication infrastructure 811.

In at least one embodiment, there is included one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A computer-implemented method comprising:
receiving, by a client device, a username, password and binding code from a user, wherein the binding code is specific to the client device;
transmitting, by the client device, a request for a session code generated by a server device, wherein the session code is a random one-time use code provided by the server device;
receiving, by the client device, the session code from the server device;
generating and displaying, by the client device, a random pattern keypad as a function of the binding code and the session code;
receiving, by the client device, a password input from the user via the random pattern keypad;
generating, by the client device, a virtual one-time password based on the password input from the user; and
transmitting, by the client device, the virtual one-time password to the server device to authenticate the client device and access services offered by the server device.

2. The method of claim 1, wherein the random pattern keypad includes a plurality of number inputs, each number input associated with a corresponding number value and a corresponding number label, at least some of the corresponding number labels differing from the corresponding number values.

3. The method of claim 1, further comprising:
receiving a second binding code from the user;
wherein the random pattern keypad is generated, by the client device, based on the second binding code and the session code.

4. The method of claim 1, wherein the client device is a public device and wherein the binding code expires after the server device authenticates the client device using the binding code a predetermined number of times.

5. The method of claim 1, wherein the session code expires after the server device authenticates the client device.

6. The method of claim 1, wherein the password input from the user is a static password.

7. The method of claim 1, wherein the random pattern keypad is generated using a random number generator.

8. The method of claim 7, wherein the random number generator includes an initial seed value; and wherein the initial seed value is based on the binding code and the session code.

9. A system, comprising:
memory operable to store at least one program;
at least one processor in communication with the memory, in which the at least one program, when executed by the at least one processor, causes the at least one processor to perform the steps of:
receiving, by a client device, a username, password and binding code from a user, wherein the binding code is specific to the client device;
transmitting, by the client device, a request for a session code generated by a server device, wherein the session code is a random one-time use code provided by the server device;
receiving, by the client device, the session code from the server device;
generating and displaying, by the client device, a random pattern keypad as a function of the binding code and the session code;
receiving, by the client device, a password input from the user via the random pattern keypad;
generating, by the client device, a virtual one-time password based on the password input from the user; and
transmitting, by the client device, the virtual one-time password to the server device to authenticate the client device and access services offered by the server device.

10. The system of claim 9, wherein the random pattern keypad includes a plurality of number inputs, each number input associated with a corresponding number value and a corresponding number label, at least some of the corresponding number labels differing from the corresponding number values.

11. The system of claim 9, the at least one processor to further performing the steps of:
receiving a second binding code from the user;
wherein the random pattern keypad is generated, by the client device, based on the second binding code and the session code.

12. The system of claim 9, wherein the client device is a public device and the binding code expires after the server device authenticates the client device using the binding code a predetermined number of times.

13. The system of claim 9, wherein the session code expires after the server device authenticates the client device.

14. The system of claim 9, wherein the password input from the user is a static password.

15. The system of claim 9, wherein the random pattern keypad is generated using a random number generator.

16. The system of claim 15, wherein the random number generator includes an initial seed value; and wherein the initial seed value is based on the binding code and the session code.

17. The system of claim 9, wherein the memory and the at least one processor are stored on the client device.

18. The method of claim 1, wherein the password input is an alphanumeric password input.

19. The system of claim 9, wherein the password input is an alphanumeric password input.

* * * * *